United States Patent

[11] 3,608,642

[72] Inventor John F. Culp
Rte. 1, Box 163, Bell City, Mo. 63735
[21] Appl. No. 807,062
[22] Filed Mar. 13, 1969
[45] Patented Sept. 28, 1971

[54] FIELD CULTIVATOR
7 Claims, 10 Drawing Figs.

[52] U.S. Cl............................................. 172/62,
172/98, 172/102, 172/122, 172/669, 56/372
[51] Int. Cl...................................... A01b 33/02,
A01b 33/14
[50] Field of Search............................ 172/546,
97, 98, 101, 102, 61, 62, 673, 676, 534, 341, 63;
56/372; 17/122, 62

[56] References Cited
UNITED STATES PATENTS
| | | | |
|---|---|---|---|
| 1,186,375 | 6/1916 | Burrows | 172/97 |
| 1,718,638 | 6/1929 | Dirschauer | 172/97 |

FOREIGN PATENTS
| | | | |
|---|---|---|---|
| 584,445 | 10/1958 | Italy | 197/98 |

Primary Examiner—Robert E. Pulfrey
Assistant Examiner—Stephen C. Pellegrino
Attorney—Cohn and Powell ABSTRACT: The field cultivator provides support for a cross cultivator unit which comprises a rotative drum mounting a plurality of spring-loaded rake members actuated by a cam member fixed to support means. The cam member engages the orbiting rake members to induce alternating priming and raking stroke of the rake members as the drum rotates. Associated wheels of the field cultivator are linked by synchronizing mechanism to assure alignment of the cross cultivator unit and turning control of the unit as a whole.

PATENTED SEP 28 1971
3,608,642
SHEET 1 OF 3

INVENTOR
JOHN F. CULP
BY
*Cohn and Powell*
ATTORNEYS

INVENTOR
JOHN F. CULP
BY
Cohn and Powell
ATTORNEYS

INVENTOR
JOHN F. CULP
BY
Cohn and Powell
ATTORNEYS

FIELD CULTIVATOR

BACKGROUND OF THE INVENTION

This invention relates in general to improvements in field cultivators, and in particular, to an improved field cultivator having a cross cultivator raking attachment.

There are, of course, many different forms of cultivators used for a variety of tasks, such as thinning and weeding, loosening of the soil and other common cultivator purposes.

Frequently, such cultivator devices are mounted directly to a tractor and suffer for this reason from being of necessity overly compact. This arrangement frequently produces difficult maintenance problems. The recourse to tractor mounting is partly the result of inherent difficulties encountered in turning independent cultivator units when the end of the rows is reached. Weeders which depend on lateral cutting action are known in the art which utilize cam action. However, such cam action has, in general, been applied to a frame mounting the tools, rather than to the tools themselves.

Reciprocating pistons and crankshafts appear to be the most common means of inducing lateral movement into individual cultivating attachments and complicated linkage mechanisms are likewise known to have been used for this purpose.

A disability which appears to be inherent in crop cultivators of the type under discussion is the lack of any alignment mechanism to ensure that the cultivator maintains its travel in register with the crop row. This is another reason why there is a tendency to combine the cultivator with the tractor unit, notwithstanding the disadvantages already alluded to, which result from such an arrangement.

The field cultivator of the present invention incorporates a cross cultivator unit providing an intermittent raking function. The cross cultivator unit may be adapted for mounting directly onto a tractor but it is preferably mounted on an independent frame.

Lateral raking action is achieved by means of a cam member cooperating directly with a plurality of cross raking tools mounted on a drum structure, the drum structure having an axis of rotation substantially concentric with the cam member.

When utilized on an independent cultivator frame, synchronized alignment mechanism ensures that the tool providing raking action is correctly oriented between crop rows. Such alignment mechanism also facilitates the turning of the independent frame when the end of the row is reached.

The cross cultivator unit includes a rotative means mounted in pivotal relation to a support means. A resilient rake member is carried by one of the means and a cam member, adjacent the rake member, is carried by the other of the means, the rake and cam members engaging as the rotative means rotates, whereby to induce alternate priming and raking strokes of the rake member.

The cam member is concentric to the axis of rotation and includes a substantially helical face having a single turn and a pitch substantially equal to the stroke of the rake member. The rake member orbits about the axis of rotation of the rotative means and, by engagement with the cam face, is spring-loaded. The spring-loading is released at the end of the helical face and a new cycle of priming and releasing is commenced.

Preferably, the rotating frame includes a plurality of resilient rake members disposed in peripheral, spaced relation about the axis of rotation of the rotating frame, and the support means includes opposed, downwardly depending bracket portions between which the rotating frame is pivotally mounted. The cam member is fixedly attached to one of the depending bracket portions adjacent the end of the rotating frame.

The rotating frame includes a plurality of slotted, elongate tubular members extending between and interconnecting opposed ground-bearing end members of the rotating frame. Each shaft is disposed in telescopic relation within an associated tubular frame member, each shaft including an end portion projecting selectively beyond the ground-bearing end member to engage the cam member in reciprocating relation. The slot defines the travel of a rake head carried by the shaft.

The support means includes a frame having at least two matched pairs of ground wheels disposed in spaced relation about the midpoint of the raking stroke and adapted to ride in adjacent furrows. Each wheel includes a peripheral guide fin, the wheel being attached to the frame by vertical pivot means which permits selective angular movement of the plane of the fin. A radial arm is connected to each pivot means, and a link member interconnects radial arms of associated wheels whereby to turn the wheels in concert and guide the frame into correct alignment with the furrows when power is applied to the link member.

DESCRIPTION OF THE PREFERRED EMBODIMENT

Figure 1:
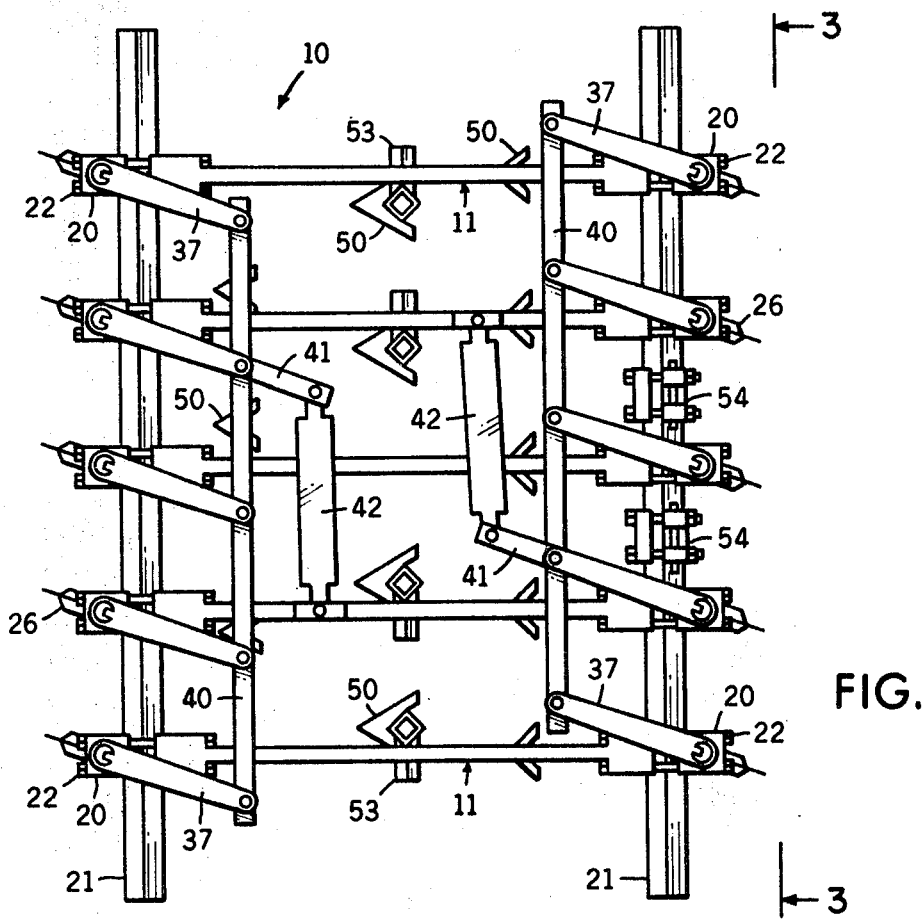
FIG. 1 is a plan view illustrating a field cultivator adjusted for narrow gauge rows; the cross cultivator units are omitted for clarity.
Figure 5:
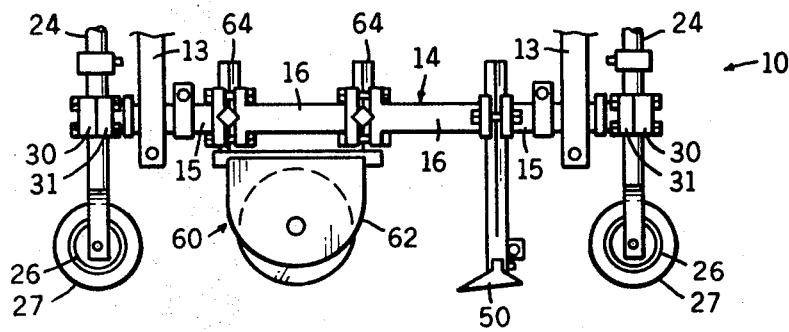
FIG. 5 is a fragmentary end view of the field cultivator illustrated in FIG. 4.
Figure 4:
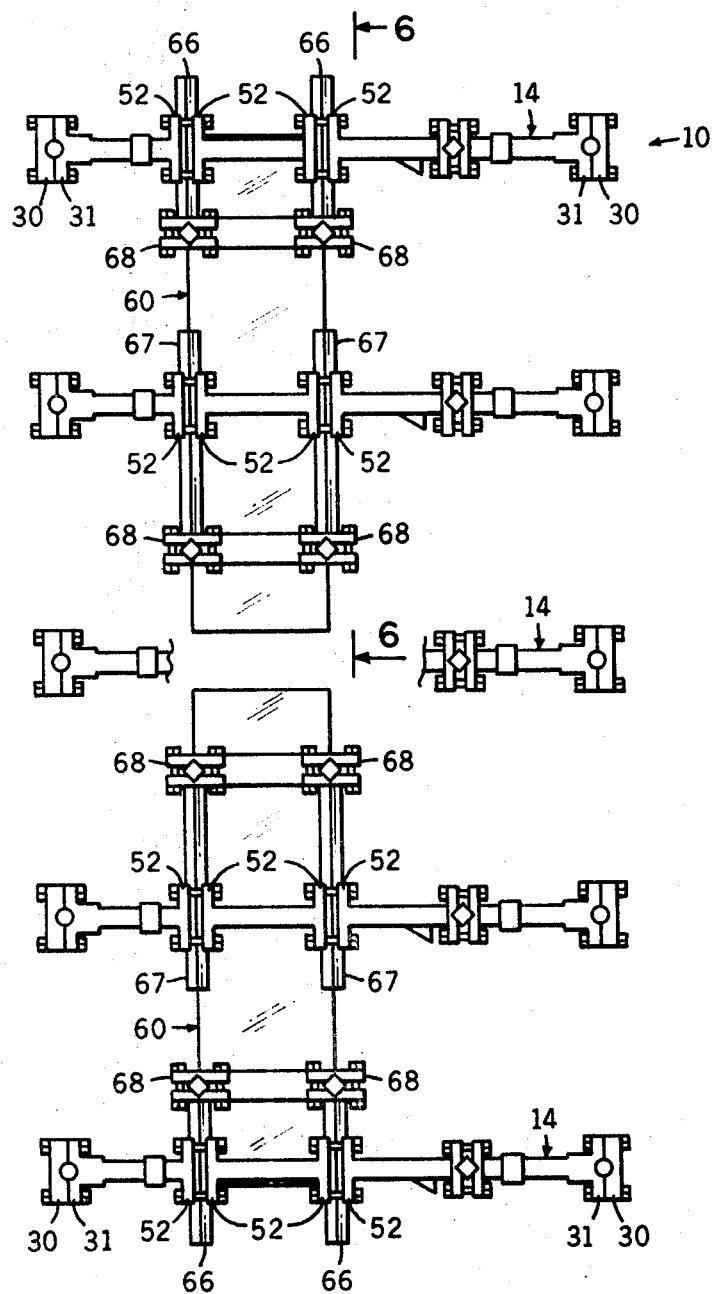
FIG. 4 is a plan view illustrating a field cultivator having cross cultivator units mounted thereon; the field cultivator is adjusted for wide gauge rows and the vertical frames are omitted for clarity.

Referring now by characters of reference to the drawings and first to FIG. 1, it will be understood that the field cultivator, generally shown by numeral 10 and adapted for normal cultivator operation, such as hoeing, may be adapted to carry the cross cultivator unit, generally indicated by numeral 60 in FIGS. 4 and 5 and shown with particularity in FIGS. 6 through 10.

The field cultivator 10 includes a plurality of vertical frames 11. Each vertical frame 11 includes an upper framing member 12, of substantially U-shaped configuration and including depending legs 13, and a compound, lower framing member 14 which includes outer portions 15 and inner portions 16.

The upper framing member 12 includes V-shaped notches 17 matching associated notches 18 formed in saddles 20, the saddles 20 being disposed in adjacent relation on either side of the framing member 12. The notched saddle arrangement serves to interconnect the plurality of vertical frames 11 to a pair of longitudinal beams 21. Each frame 11 is held in adjustable relation to the beams 21 by means of bolts 22.

Each saddle 20 includes a vertical aperture 23 which receives an elongate pintle 24, and each pintle 24 includes a forked end 25 mounting the ground wheel 26. The pintles The constitute pivot means which permit swiveling of each ground wheel 26. Each ground wheel 26 includes a peripheral guide fin 27 which acts as a blade tending to stabilize rotation of the wheel.

A saddle 30 is disposed at each end of each lower framing member 14, the saddles 30 cooperating with the end portions 31 of the framing members 14 to provide a journal formation receiving and holding the lower ends of the pintles 24 in slidable relation. Each saddle 30 is bolted in place by four bolts 32.

Each pintle 24 includes spaced collars 33 and 34 at its upper and lower end respectively, which provide abutment means for springs 35 and 36, the springs 35 and 36 permitting the wheel-carrying pintles to ride more smoothly over the contours of the ground. At its upper end, each pintle 24 includes a radial arm 37 fixedly attached to and controlling the swivel of the ground wheels 26.

As clearly shown in FIG. 1, an elongate link member 40 interconnects associated radial arms 37 to provide synchronized, concerted swivel movement of associated wheels 26 on each side of the field cultivator 10 and constituting synchronizing means. Further, an extension portion 41 is provided to one of the radial arms 37, which is interconnected to one end of a hydraulic extensible member 42. The other end of extensible member 42 is pivotally attached to one of the vertical frames 11. By providing two hydraulic extensible arms 42, associated sets of wheels 26 on either side of the cultivator 10 may be moved together or independently.

Figure 2:
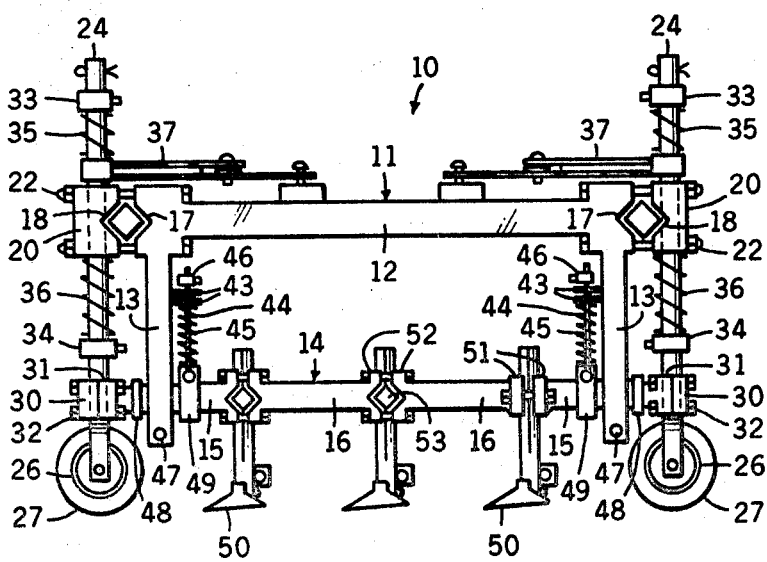
FIG. 2 is an end view of the field cultivator illustrated in FIG. 1.

As indicated in FIG. 2, the lower framing members 14 are independently suspended from the depending legs 13 of the U-shaped upper frame 12. Lugs 43 extending outwardly from each leg 13, act as an abutment for springs 44 disposed about rods 45, the rods 45 being attached, in each case, to a collar 46 disposed about the lower framing member 14. The lower ends of the depending legs 13 are forked to receive the lower framing member 14, whereby to hold the framing member 14 against movement out of the plane of the vertical frame 11. A pin 47 retains the framing member 14 in a vertical direction and the framing member 14 includes opposed shoulders 48 which cooperate with the collars 46 to hold the framing member 14 against lateral movement.

Figure 3:
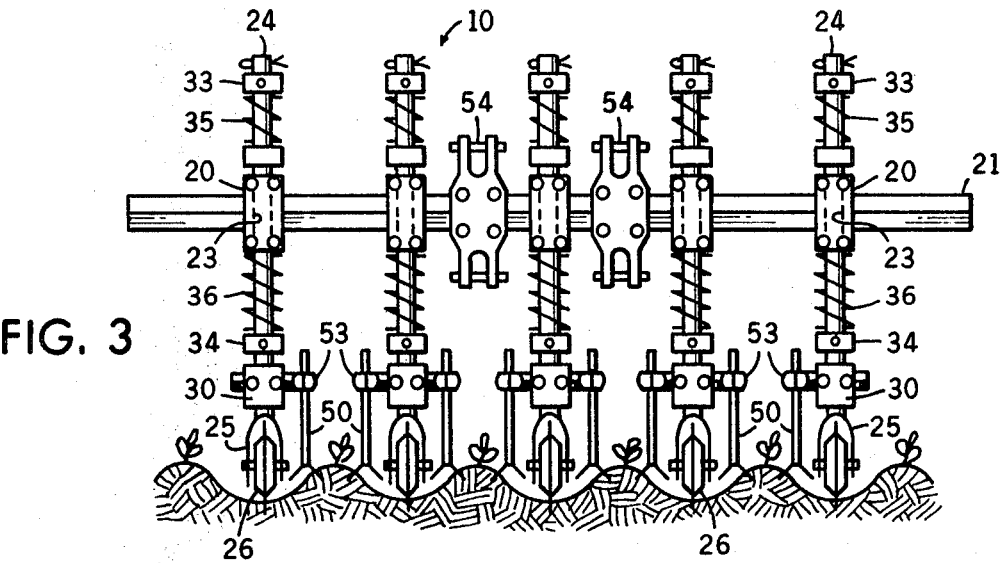
FIG. 3 is a front view of the field cultivator illustrated in FIG. 1.
Figure 7:
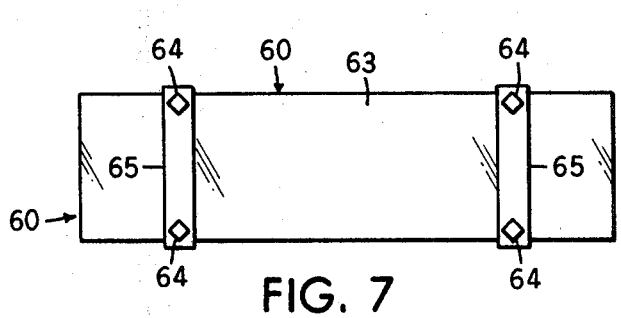
FIG. 7 is a plan view of a cross cultivator unit.

Each compound lower framing member 14 is adapted to carry a plurality of hoe members 50. Adjacent ends of the outer portions and inner portions 15 and 16 respectively are formed into saddle portions 51 and 52 respectively to accept the hoe member 50 directly or to accept an extension member 53, as shown in FIG. 3, which is itself adapted to accept a hoe member 50. Generally speaking, for narrow gauge rows, one hoe member 50 for each lower framing member 14 is sufficient. For wider gauge rows, additional hoe members spaced between the vertical frame 11 are necessary.

One of the longitudinal beams 21 includes a pair of spaced, hitch members 54. The hitch members 54 are adapted to be hitched to a tractor (not shown) and permit the field cultivator to be pushed or pulled as desired.

FIGS. 6 through 10 illustrate a cross cultivator unit 60 which is adapted to be mounted to the field cultivator 10. FIGS. 4 and 5 indicate clearly how the field cultivator 10 may be adapted for the mounting of the cross cultivator unit. As shown in FIGS. 4 and 5, the cross cultivator unit 60 is mounted to the lower framing members In FIG. 4, the vertical frames 11 are omitted for clarity. As the spacing of the lower frame members 14 indicates, the field cultivator 10 is set up as it would be for wide gauge row operation.

The cross cultivator unit 60 includes a substantially U-shaped support frame 61 providing downwardly depending bracket portions 62 at each end. In the preferred embodiment, four vertical stems 64 are attached to the upper horizontal member 63 of the U-shaped support frame 61. This connection is made through the medium of a pair of straps 65 secured to the upper members 63. The vertical stems 64 are attached to the straps 65 in fixed relation as by welding.

The vertical stems 64 serve to mount the cross cultivator unit 60 to the field cultivator 10. By comparing FIGS. 1 and 6, it will be understood that the saddles 52, which accommodate extension members 53 (FIG. 1) during normal hoeing operation are adapted also to accommodate extension members 66 and 67 4). The extension members 66 and 67, in turn, are adapted to accommodate the stems 64 of the cross cultivator unit 60. Saddles 68 which are bolted to each of the extension members 66 and 67, permit vertical adjustment of the cross cultivator unit 60.

Returning to FIGS. 6 through 10, it will be understood that the cross cultivator unit 60 is a raking device and to this end includes an open framework drum, generally shown by numeral 70, which constitutes a rotative means.

The drum 70 includes a plurality of elongate tubular framing members 71 interconnecting intermediate and end members 72 and 73 respectively to which they are attached as by welding. The drum 70 is supported in rotative relation by stub shafts 74 and 75 constituting pivot means. The stub shaft 74 includes a thrust bearing journal 69 connecting the shaft 74 to an adjacent end member 73.

Figure 9:
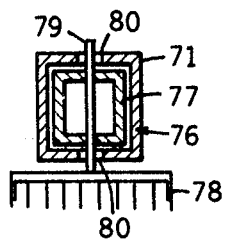
FIG. 9 is an enlarged detail shown in cross section of the telescopic rake member illustrated in FIG. 8.
Figure 10:
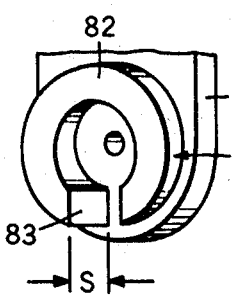
FIG. 10 is an enlarged perspective view of the cam member mounted to the support means as illustrated in FIG. 6.

The elongate framing members 71 are hollow and preferably of square section as clearly shown in FIG. 9. Each member 71 is thus adapted to receive the square shaft 77 of a reciprocating rake member 76. The shaft 77 and the framing member 71 are disposed in telescopic relation relative to each other, and each rake member 76 includes a pair of rake heads 78 attached to the shaft 77 by means of stems 79 projecting from opposed faces of the shaft 77, as clearly shown in FIG. 9. Opposed faces of the elongate framing members 71 include slots 80, which act to guide the stems 79 and therefore define the path of the rake heads 78.

A concentric cam member 81 is interposed between an end member 73 of the drum 70 and one of the bracket portions 62 of the U-shaped support frame 61, the cam member 81 being attached to the bracket portion 62 in fixed relation as by welding. The cam member 81 includes an inclined, substantially helical face 82 which terminates in an abrupt end 83 having a stroke indicated by the letter S. Each of the shafts 77 of the rake members 76 project outwardly beyond the end member 73 of the drum 70 to engage with the cam face 82. A ball bearing or other suitable means indicated by numeral 77a is provided at the end of the shaft 77 to facilitate the engagement action.

It will be understood that as the drum 70 rotates, each shaft 77 will follow the cam face and thereby be telescopically urged within the elongate framing member 71. Compression springs 84 are provided about each framing member 71, which are retained between the inside face of an end or intermediate member 72 or 73 respectively and the stem of an associated rake head 78.

This arrangement provides that as each shaft 77 is urged within its associated framing member 71, the rake head 78 is urged rearwardly against the loading of the spring 84. Thus, on the completion of one orbit about the axis of rotation of the drum 70, the shaft undergoes a priming stroke. At the end of the orbit, the shaft reaches the cam end 83 immediately causing the shaft to be released and moved outwardly carrying the rake heads 78 with it to perform a raking stroke. Because of the location of the cam end 83, the raking stroke takes place at bottom of dead center of the drum rotation. The rake action, therefore, occurs with the rake head 78 in contact with the earth.

It will be understood that the force induced into the springs by cam action on the shafts 77 is resisted by the thrust bearing of the pivot shaft 74. It will be further understood that the distance S corresponds to the stroke of the reciprocating shaft 77. In effect, the stroke S is equal to the pitch of the helical turn of the inclined face 82 of the cam member 81.

It is thought that the functional advantages and the structural features of this field cultivator 10 and cross cultivator unit 60 have become fully apparent from the foregoing description of parts, but for completeness of disclosure, the operation of the cultivator will be briefly described.

Referring again to FIG. 1, it will be understood that the hitch members 54 are adapted so that the implement may be either pulled or pushed by a tractor. It will be assumed, for example, that forward motion is the direction of the arrow and that the frames 11 have been adjusted, relative to the longitudinal beam 21 to a desired gauge of row. The field cultivator 10 may be steered by applying selective pressure to the hydraulic extensible arms 42, either together or independently. This pressure will be transferred through the medium of the individual links 40 to each of the radial arms 37 of an associated row of ground wheels 26. The length of the radial arms 37 is such that a wide range of row gauges may be attained merely by changing the length of the link member 40, or alternatively providing a link member 40 with adjustment apertures.

The controlled swiveling of an associated row of ground wheels 26 may be used with double advantage. For example, if it is desired to align the wheels more accurately within the rows, the link members 40 will be moved in opposite directions as shown in FIG. 1, until alignment has been achieved and then moved back to a neutral position. If, on the other hand, it is desired to turn the field cultivator 10 at the end of the rows, the link members 40 may be moved in the same direction, thus swiveling rows of associated shells 26 in opposite directions. This wheel control immeasurably facilitates the turning section of the field cultivator 10.

The alignment feature discussed above has particular application with regard to the cross cultivator unit 60 because it is of importance that the rake stroke be placed in register in between the rows so that the desired portion of earth will be raked.

Figure 8:
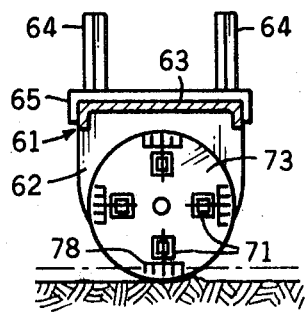
FIG. 8 is a sectional view taken on line 8—8 of FIG. 6.
Figure 6:
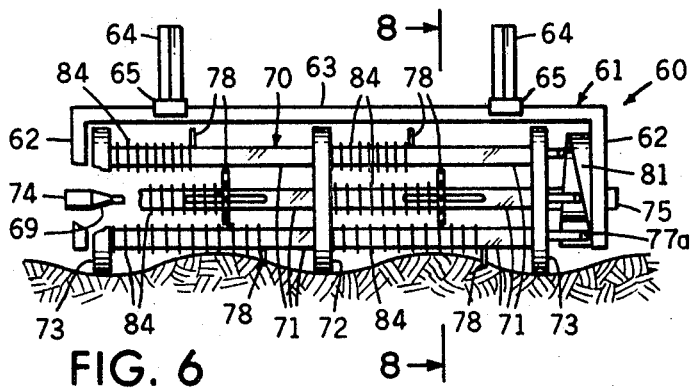
FIG. 6 is view taken on line 6—6 of FIG. 4 illustrating a cross cultivator unit only.

In the preferred embodiment of the cross cultivator unit 60, the rake members 76 are circumferentially disposed about the axis of rotation of the drum 70 as is clearly shown in FIG. 8. This arrangement provides intermittent raking strokes at predetermined ground intervals to suit specific planting.

Although in the preferred embodiment, the drum 70 includes intermediate and end members 72 and 73 respectively which are ground bearing, it will be understood that the drum 70 could easily be turned by an independent source, such as a belt and motor. Such independent turning would have the advantage that the drum 70 could be rotated at a greater or lesser speed than ground speed and thus the raking interval could be more closely controlled. If such were desired, the end members 72 and 73 could, for example, simply be made a smaller diameter so as not to be in contact with the ground and one of them adapted to receive a belt drive to a motor and transmission.

I claim as my invention:

1. A cross cultivator unit, comprising:
   a. a support means, including opposed depending bracket portions,
   b. a rotative means rotatively mounted between the bracket portions,
   c. a cam member carried by one of the bracket portions and being substantially concentrically disposed relative to the axis of rotation of the rotative means,
   d. a resilient rake member carried by the rotative means in adjacent relation to the cam member, and including a shaft engaging the cam member,
   e. mounting means mounting the shaft in rotative relation to the axis of rotation of the rotative means for orbital movement about the axis and raking movement transverse to the bracket portions, and
   f. the cam member engaging the rake member to induce alternate priming and raking strokes of the rake member as the rotative means rotates.

2. A cultivator unit as defined in claim 1, in which:
   g. the cam member includes a substantially helical face having a single turn and a pitch substantially equal to the stroke of the rake member.

3. A cultivator unit as defined in claim 2, in which:
   h. the rotative means includes a pair of ground wheels spaced to ride between furrows and disposed substantially equidistant about the stroke center of the rake member.

4. A cross cultivator unit, comprising:
   a. a support frame, including a pair of depending bracket portions,
   b. a rotary frame carried by the support frame and including a plurality of elongate framing members interconnecting opposed end members and including abutment means,
   c. pivot means attaching the rotating frame between the bracket members and including a thrust bearing,
   d. a plurality of resilient rake members carried by the rotating frame and disposed in peripheral spaced relation about the axis of rotation of the rotating frame, each rake member including a shaft and a rake head attached to the shaft, the shaft being mounted to an associated elongate framing member and movable in longitudinal relation thereto, the abutment means of the rotating frame being disposed in spaced relation from each rake head,
   e. a spring disposed between the abutment means and each rake head,
   f. a cam member mounted in fixed relation to the support frame and engageable by the rake members to induce alternate priming and raking strokes of the rake members consecutively, as the rotating frame rotates, to provide intermittent raking between furrows, the cam member being substantially concentric to the axis of rotation and being attached to one of the bracket portions adjacent the rotating frame, the cam member including an inclined surface portion engaged by each shaft and latch portion, and
   g. rotation of the rotating frame relative to the cam member urges each shaft selectively into a spring-loaded, primed condition during engagement with the inclined portion and releases the spring at the latch portion to precipitate the raking stroke and
   h. the thrust bearing of the pivot means transfers load from the shafts to one of the bracket portions.

5. A cross cultivator unit, comprising:
   a. a support frame, including a pair of spaced downwardly dependent bracket portions,
   b. a rotating frame carried by the support frame and including a plurality of elongate tubular members extending between and interconnecting opposed ground-bearing end members, each of the elongate members including a slot,
   c. a plurality of resilient rake members carried by the rotating frame and disposed in peripheral spaced relation about the axis of rotation of the rotative frame, each rake member including a shaft having a head portion and an end portion and each shaft being disposed in telescopic relation to an associated tubular frame member whereby the end portion projects selectively beyond one of the ground-bearing members, and
   d. a cam member mounted in fixed relation to one of the bracket portions and engageable by the rake members to induce alternate priming and raking strokes of the rake members consecutively, as the rotating frame rotates, to provide intermittent raking between furrows, the cam member including a substantially helical face having a pitch substantially equal to the stroke of the rake members,
   e. the end portion of each shaft projecting selectively beyond said one ground-bearing member engages the cam member in reciprocating relation, the slot of the associated elongate member defining the travel of the head portion.

6. A cross cultivator unit, comprising:
   a. a support frame, including at least two matched pairs of ground wheels disposed in spaced relation about the midpoint of the raking stroke and adapted to ride in adjacent furrows,
   b. a rotating frame carried by the support frame,
   c. a plurality of resilient rake members carried by the rotating frame and disposed in peripheral spaced relation about the axis of rotation of the rotating frame,
   d. a cam member mounted in fixed relation to the support frame and engageable by the rake members to induce alternate priming and raking strokes of the rake members consecutively, as the rotating frame rotates, to provide intermittent raking between furrows, and
   e. synchronizing means synchronizing associated wheels of each matched pair to turn the wheels into correct alignment whereby the rake members are substantially in register with the ridge between the furrows.

7. A cultivator unit as defined in claim 6, in which:
   f. each wheel includes a peripheral guide fin,
   g. each wheel includes vertical pivot means connecting the wheel to the support frame and permitting selective angular movement of the plane of the guide fin,
   h. a radial arm is connected to each pivot means, and
   i. a link member interconnects radial arms of associated wheels to turn the wheels in concert.